Sept. 22, 1959

T. W. BONNER ET AL 2,905,826

MEASUREMENT OF GAMMA RAY ENERGY DUE TO
INELASTIC NEUTRON SCATTERING

Filed Sept. 30, 1953

TOM W. BONNER
RICHARD L. CALDWELL
INVENTORS

BY *D. Carl Richards*

ATTORNEY

Sept. 22, 1959     T. W. BONNER ET AL     2,905,826
MEASUREMENT OF GAMMA RAY ENERGY DUE TO
INELASTIC NEUTRON SCATTERING Filed Sept. 30, 1953     2 Sheets-Sheet 2

TOM W. BONNER
RICHARD L. CALDWELL
INVENTORS

BY *D. Carl Richards*
ATTORNEY

United States Patent Office 2,905,826
Patented Sept. 22, 1959

2,905,826

MEASUREMENT OF GAMMA RAY ENERGY DUE TO INELASTIC NEUTRON SCATTERING

Tom W. Bonner, Houston, and Richard L. Caldwell, Dallas, Tex., assignors, by mesne assignments, to Socony Mobil Oil Company, Inc., a corporation of New York Application September 30, 1953, Serial No. 383,209

9 Claims. (Cl. 250—83.6)

The present invention relates to logging bore holes and more particularly to the analysis of the energy spectrum of gamma ray radiations artificially produced in formations adjacent a bore hole.

A number of methods are known and have been made commercially available in the well logging art for studying the radioactive properties of earth formations, both where the radioactivity is natural and where it is artificially induced. Logs of such properties aid immeasurably in the study of the nature of the subsurface formations, particularly in exploration for mineral or petroliferous deposits of such quantities as to make them commercially inviting.

The present invention is based upon the discovery that certain of the elements in earth formations exhibit hitherto unrecognized distinctive properties and that such properties are measurable in situ. More specifically, it has been found that a class of elements occurring in earth formations including carbon, oxygen and sulphur, when bombarded by neutrons of a selected energy, produces prompt gamma rays of a characteristic energy level, such characteristic energy level being fairly distinctive for each of the above elements. It has further been found that other elements abundant in earth formations, for example sodium, iron, magnesium and chlorine, exhibit no such characteristic features that are readily detectable. A controlled measurement of the prompt gamma rays arising from such energy levels therefore will yield a distinctive log of the content in such formations of the selected element.

In accordance with the present invention, a log is produced by inserting into a drill hole a source from which neutrons are emitted having an energy at least equal to the characteristic nuclear energy level of a selected element thereby to bombard the formations along the length of the bore hole. Then a measurement is made of the component of prompt gamma radiations thus produced by the neutron bombardment having energies within a restricted energy band which includes the characteristic nuclear energy level of the selected element. Such measurements are plotted on a depth scale thereby to produce an indication of the concentration of the element along the bore hole. In a preferred form of the invention, a gamma-free monoenergetic neutron source is utilized so that analysis of the radiation of gamma rays resulting from neutron bombardment will not be complicated by the gamma rays produced directly by the bombarding source.

In another aspect of the invention, a somewhat more conventional source is utilized in which production of neutrons is accompanied by production of gamma rays. In addition there is provided a directional shielding means between the neutron source and the gamma ray detector so that gamma rays may not travel directly from source to detector. Although the shielding means prevents gamma rays from reaching the detector by way of a direct path, gamma rays scattered in the formations and not produced by a reaction due to neutron bombardment may reach the detector. The energy level of such gamma radiation is substantially reduced due to the scattering action so that measurements may substantially be restricted to the gamma radiation produced by neutron bombardment by exercising selectivity on an energy basis. Thus, in this as well as other aspects of the invention, measurement of a gamma ray radiation is restricted to a predetermined limited portion of or "window" in the prompt gamma radiation spectrum thereby producing measurements that are primarily indicative of but one of the selected elements.

For a more complete understanding of the invention and further objects and advantages thereof, reference may now be had to the following description taken in conjunction with the accompanying drawings in which.

Figure 1:
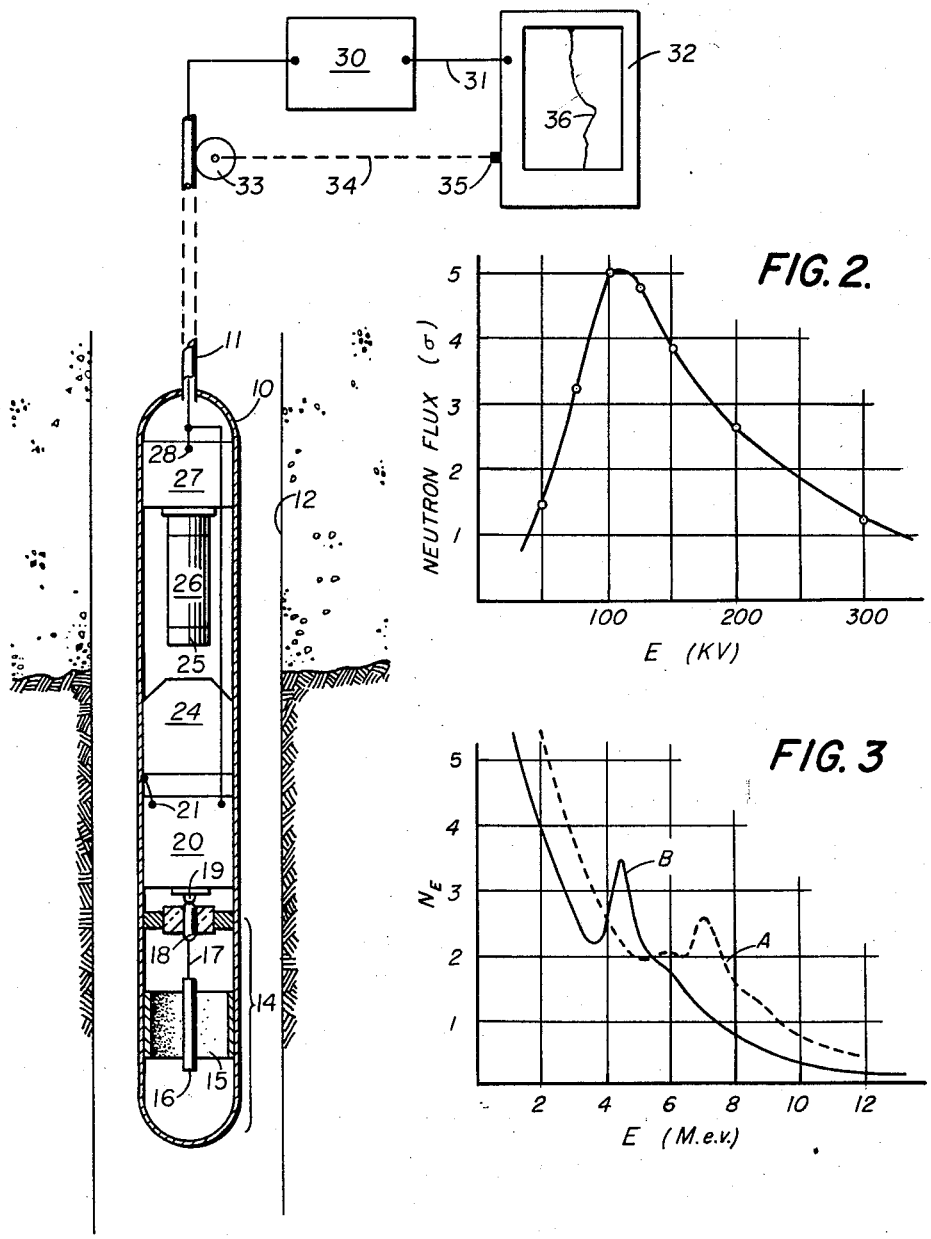
Fig. 1 illustrates one form of apparatus for producing a gamma ray log.

Referring now to Fig. 1, a well logging system is illustrated in which an exploring unit 10 is supported by a cable 11 from the earth's surface in such a manner as to be moved along the length of a bore hole 12. Suitable means such as a cable winch and driving mechanism (not shown) may be provided for effecting the desired movement of the exploring unit 10.

In the form illustrated, the exploring unit 10 may comprise an outer metallic case having a lower compartment 14 in which there is provided a source of monoenergetic neutrons. Preferably such neutron source is provided by filling the lower enclosed portion with deuterium gas (H$^2$) at a pressure of from 10$^{-3}$ to 10$^{-5}$ mm. of mercury. A target electrode 15 in the form of a relatively short metallic cylinder fitted inside the housing 10 has an inner surface characterized by or formed of a thin layer of zirconium upon which tritium gas (H$^3$) has been adsorbed. The target electrode, while of cylindrical form, may be composited from a number of cylindrical segments. For example, aluminum segments may be provided on which zirconium has been evaporated and to which tritium has been adsorbed. The segments may then be suitably mounted inside the housing of unit 10, together forming a cylindrical target unit. The electrode 15 is made electrically common with the exploring unit case.

A central cylindrical electrode 16 is mounted (by suitable insulating means not shown) at the axis of the unit 10 and thus at the center of electrode 15 and is connected by way of conductor 17 and insulating terminal 18 to the positive terminal 19 of a high voltage source 20. The negative terminal 21 of source 20 is connected to the case of unit 10 so that the voltage from source 20 is effective to accelerate deuterons onto target electrode 15.

Figure 2:
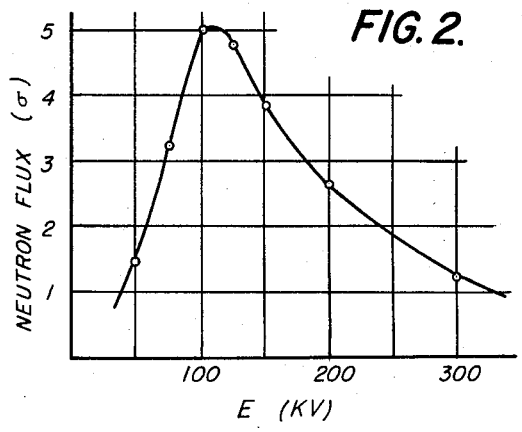
Fig. 2 is a plot of neutron flux from a particular source as a function of the applied voltage.

In Fig. 2 it will be seen that the neutron flux ($\sigma$) produced in a neutron source, such as in chamber 14 of Fig. 1, varies as a function of the accelerating potential E between target 15 and electrode 16. It will be seen that for a given pressure of deuterium gas in the chamber the maximum neutron flux is produced with an accelerating potential of approximately 110,000 volts. It will be seen further that at even lower voltages an appreciable flux is produced. While higher voltages are preferred, neutrons may thus be produced at voltages above a minimum of approximately 5,000 volts in the bombardment of the tritium adsorbed on the zirconium film on the inner face of target electrode 15.

It is well known that for such a reaction monoenergetic neutrons having energy of 14 million electron volts (m.e.v.) are produced and that the reaction is free of production of gamma radiation. The neutrons thus produced bombard formations adjacent bore hole 12, driving the nuclei of certain of the elements in the formations to an excited state which, for the purpose of this description, will be referred to as a "characteristic energy level" which is an energy level higher than occupied by a given nucleus in the stable state. Inelastic scattering of the neutrons results in the excitation of nuclei to a characteristic energy level. Such excited nuclei return to a stable state and in doing so lose energy which exhibits itself in the form of radiations among which the prompt gamma radiation, as will hereinafter be shown, is of a unique nature for certain of the elements, thus permitting identification thereof.

Figure 3:
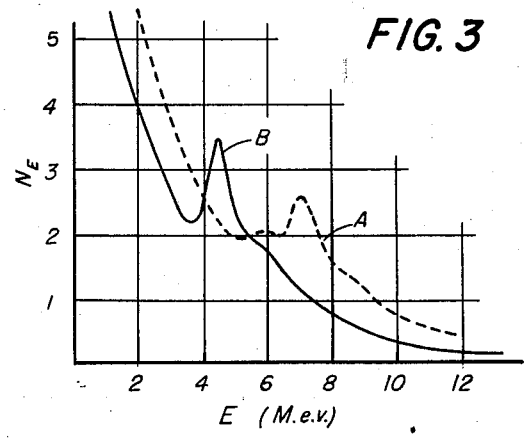
Fig. 3 is a plot of the prompt gamma ray radiation produced upon bombardment by neutrons for carbon and oxygen.

More particularly, as shown in Fig. 3 the number ($N_E$) of gamma rays produced with energies lying within a small energy range or "window" as a function of the energy (E) of the center of the "window" for such gamma rays is plotted for two elements. It will be noted that for oxygen (curve A) there is a first characteristic energy band at 6 m.e.v. and a second band at 7 m.e.v. It will further be seen that carbon (curve B) exhibits a peak at 4½ m.e.v. Although not shown, sulphur has been found to exhibit a peak at approximately 2 m.e.v. It has further been found that there are no such pronounced lines in the gamma ray spectrum of sodium, iron, magnesium and chlorine when detected in the manner here described.

With the above elements appearing in earth formations, the presence of certain distinctive properties for some of the elements and complete absence of such properties for other of the elements provides an index to formation character. More particularly, a measurement of the number of prompt gamma rays in an energy band of from 6 to 7 m.e.v. as a function of bore hole depth primarily is a log of the oxygen content of the formations along the bore hole. Similarly, a log of the prompt gamma rays having an energy within a restricted band or window centered at 4½ m.e.v. is primarily a log of the carbon content of the formations. Sulphur similarly may be logged.

The measurements above referred to may be made by the system shown in Fig. 1 in which a scintillation counter together with a pulse height analyzer are utilized. More particularly, a scintillation crystal 25 (sodium-iodide, thallium activated) is mounted in a manner understood by those skilled in the art at the lower end of and adjacent the window of a photomultiplier tube 26. The crystal 25 is shielded from the source chamber 14 by a copper slug 24 which impedes neutron travel in the direction of the crystal 25. The photomultiplier tube and its associated circuits, housed in unit 27, when actuated by light pulses produced in crystal 25, produce a series of pulses in unit 27. Each pulse is proportional to the energy of the gamma rays impinging in scintillation crystal 25. Such pulses are then applied to a differential pulse height analyzer contained in unit 27 which produces at its output terminal 28 an electrical indication proportional to the number of gamma rays impinging crystal 25 within a given energy band.

In practice, the differential pulse height analyzer in unit 27 may be selectively adjusted for each run of the unit 10 through the bore hole to cause an electrical indication at terminal 28 to be dependent upon and preferably proportional to the number of gamma rays having energy within one of the selected energy bands specific to one of the elements exhibiting characteristic gamma rays under neutron bombardment. Such indication is then transmitted uphole by way of cable 11 and applied to an amplifier 30 whose output in turn is applied by way of the channel 31 to a recorder 32. The recording medium of recorder 32 may be driven as by a sheave 33 in such a manner that its length is proportional to the depth of the exploring unit in the bore hole. Sheave 33 is mechanically coupled by link 34 to the recorder drive shaft 35. Thus the trace 36 on the recorder chart exhibits variations which are proportional to variations in the concentration of a given element. The particular element selected is dependent upon the adjustment of the pulse height analyzer 27 particularly its base line and window width.

Pulse height analyzers are well known and understood by those skilled in the art. A system suitable for use in connection with the present invention is illustrated and described in "Experimental Nuclear Physics," vol. I, by E. Segre, John Wiley and Sons, New York, N.Y.; 1953, page 91, Fig. 32. In avoidance of bore transmission problems, it will be preferred to place the pulse height discriminator in the bore hole unit as above indicated where it may form a part of unit 27. Further, multichannel devices may be utilized to detect simultaneously each of the several elements of interest which exhibit an identifying resonance phenomena.

Figures 4, 5:
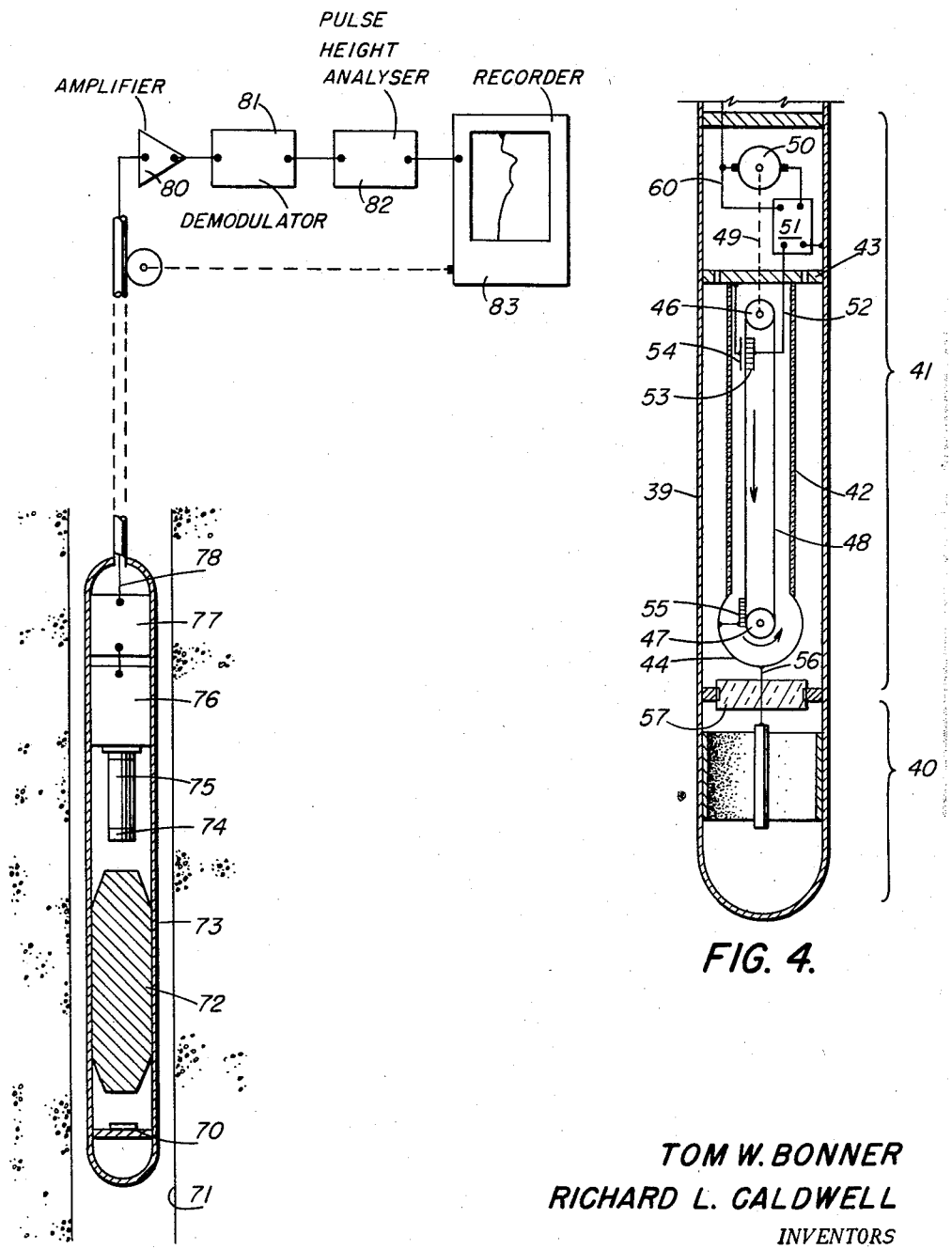
Fig. 4 illustrates an alternative type of voltage source.
Fig. 5 illustrates a further embodiment of the invention.

Referring now to Fig. 4, there is illustrated a portion of a logging unit including a Van de Graaff type generator as a voltage source. The generator components are suitably supported within and adjacent the lower end of the instrument housing 39. Like the lower compartment 14 in Fig. 1, the lower compartment 40 of Fig. 4 is sealed from the remaining portion of the housing 39 and contains the necessary elements for producing a deuterium ($H^2$) on tritium ($H^3$) reaction when energized from the voltage generator.

In the form illustrated, a second compartment 41 in the case 39 houses an insulating tubular member 42 which is supported at its upper end from a disc 43 and which carries at its lower end a hollow spherical shaped member 44. Two pulleys 46 and 47 at opposite ends of the insulating tube 42 carry a belt 48 made of silk, rubber, paper or other suitable insulator. Pulley 46 is coupled by link 49 to a drive motor 50. A voltage source 51 is provided to develop a voltage in the order of 5,000 volts in its output circuit, including conductor 52, which is then applied to a spray-on brush 53 adjacent belt 48. An electrode 54 spaced from spray-on brush 53 and on the opposite side of belt 48 is connected to bulk head 43 which in turn is electrically common with case 39. As belt 48 moves in the direction indicated, positive charges are carried downward towards pulley 47. A brush 55 adjacent pulley 47 is connected to the metallic sphere 44 and removes the charges on belt 48 thereby to build up a high potential on the exterior of sphere 44. Conductor 56 leading through insulating block 57 is connected to the high voltage electrode in compartment 40. Compartment 40, as above noted, is filled with deuterium gas at a very low pressure. However, it will be preferred, in order to provide the necessary insulation at sphere 44 to maintain a high voltage, that the compartment 41 be filled with a suitable gas under relatively high pressure. For example, compartment 41 may be filled with a gas comprised of 85% nitrogen and 15% carbon dioxide at a pressure of approximately 200 pounds per square inch thereby to permit the establishment of a high potential between sphere 44 and case 39 without causing an arc discharge therebetween.

Motor 50 and voltage source 51 are supplied with power by way of conductor 60 which leads through suitable cable means to the earth's surface and may provide a return channel to the earth's surface for signals dependent upon gamma rays produced by neutron bombardment of the formations by reason of the deuterium on tritium reaction in chamber 40.

The systems illustrated in Figs. 1 and 4 and the reaction illustrated in Fig. 2 represent a preferred apparatus and procedure for bringing about the desired bombardment of the earth formations. The preference is based principally upon the fact that by this means neutrons are produced free of gamma rays. A further characteristic which makes desirable the deuterium on tritium reaction is the fact that monoenergetic neutrons well above the characteristic nuclear energy level of the nuclei of interest are produced.

Referring now to Fig. 5, a well logging system has been illustrated in which the neutron source is of the more well known types such as commonly used in radioactive well logging. The source 70 may comprise a radium-beryllium mixture such as is well known to those skilled in the art. Preferably the source is formed by a combination of polonium and beryllium whereby neutrons are produced for bombarding the formations adjacent bore hole 71. With the preferred polonium-beryllium source, on the average several neutrons are produced for each gamma ray produced. Furthermore, these gamma rays are of energy about 800 k.e.v. which is considerably lower energy than the characteristic gamma rays from fast neutron bombardment of elements of interest in earth formations.

A shield 72 of lead is supported in the exploring unit 73 immediately above the source 70 to highly attenuate the direct gamma radiation from source 70 to the detector. A scintillation crystal 74 is mounted above and immediately adjacent the upper surface of the shield 72. Thus mounted, the crystal receives gamma radiation from the adjacent formations such as is produced upon neutron bombardment thereof. Because of the shielding device 72, the gamma rays received by crystal 74 are substantially all due to a reaction in the formation and do not have their origin at source 70. In this modification of the invention a photomultiplier tube 75 feeds a modulator 76 whose output controls an oscillator 77. The modulated oscillator output is then applied to a bore hole transmission channel including conductor 78 which leads to the earth's surface.

At the surface of the earth the modulated oscillator output is applied to an amplifier 80 and thence to a demodulator 81 whose output in turn is applied to a differential pulse height analyzer 82. The appropriate setting for or adjustment of the analyzer 82 will control the transmission of a recordable voltage to the recorder 83. Here again, as above described in connection with Figs. 1–3, signals passed to the recorder are exclusively dependent upon gamma radiation in a limited energy band or window centered at the region in which for a selected element the artificially induced gamma radiation has the maximum intensity. Logs primarily depending upon one of several different elements which ordinarily are found in earth formations may be thus produced.

While the invention has been described in connection with several modifications of apparatus and method steps, it will now be appreciated that further modifications may be made and it is intended to cover such modifications as fall within the scope of the appended claims.

What is claimed is:

1. The method of determining concentrations of a selected element of the class consisting of oxygen, carbon and sulphur in formations adjacent a drill hole which comprises irradiating formations along said drill hole with neutrons having energies at least equal to the characteristic nuclear energy level of said element to excite the energy level thereof by inelastic scattering, selectively detecting the component of prompt gamma radiation produced by said neutrons within a restricted energy band including said characteristic energy level, and recording said component as a function of bore hole depth.

2. The method of claim 1 in which said neutrons have energies of at least 7 m.e.v. and in which said energy band lies within the limits of from about 6 m.e.v. to about 7 m.e.v. thereby to produce a log primarily dependent upon the concentration of oxygen in said formations.

3. The method of claim 1 in which the neutrons have energies of at least 4½ m.e.v. and in which said energy band is centered at about 4½ m.e.v. thereby to produce a log primarily dependent upon the concentration of carbon in said formations.

4. The method of claim 1 in which the neutrons have energies of at least 2.3 m.e.v. and in which said energy band is centered at about 2.3 m.e.v. thereby to produce a log dependent upon the concentration of sulphur in said formations.

5. The method of determining concentrations of a selected element in formations adjacent a bore hole which comprises generating neutrons of energy of about 14 m.e.v. at spaced locations along said bore by accelerating deuterium ions onto tritium atoms to effect gamma-free production of said neutrons, at each of said locations detecting the component of prompt gamma radiation produced by inelastic scattering of said neutron radiation within a restricted energy band including said characteristic energy level, and recording said component on a space scale proportional to the distances between said locations.

6. A system for determining concentrations of a selected element of the class consisting of oxygen, carbon and sulphur of earth formations adjacent a bore hole which comprises a source of high energy neutrons having energies at least equal to the characteristic nuclear energy level of said element, means for traversing said bore hole with said source to irradiate said formations and excite the energy level of said element by inelastic scattering, a detector supported and movable with said source for producing an output signal dependent upon the number and amplitude of prompt gamma rays impinging said detector, and differential means for recording the component of said signal dependent upon the number of said gamma rays within a restricted window which includes said characteristic energy level in the amplitude spectrum of said gamma rays.

7. The system of claim 6 in which said window covers that portion of the energy spectrum from 6 to 7 m.e.v. for the determination of the concentrations of oxygen in said formations.

8. The system of claim 6 in which said window is centered at about 4½ m.e.v. for the determination of the concentrations of carbon in said formations.

9. The system of claim 6 in which said window is centered at about 2.3 m.e.v. for the determination of the concentrations of sulphur in said formations.

References Cited in the file of this patent

UNITED STATES PATENTS

| | | |
|---|---|---|
| 2,275,748 | Fearon | Mar. 10, 1942 |
| 2,469,460 | Fearon | May 10, 1949 |
| 2,648,012 | Scherbatskoy | Aug. 4, 1953 |
| 2,712,081 | Fearon et al. | June 28, 1955 |
| 2,752,504 | McKay | June 26, 1956 |
| 2,755,389 | Jones et al. | July 17, 1956 |

FOREIGN PATENTS

| | | |
|---|---|---|
| 491,766 | Great Britain | Sept. 8, 1938 |
| 495,617 | Great Britain | Nov. 16, 1938 |
| 526,544 | Great Britain | Sept. 20, 1940 |

OTHER REFERENCES

"Radioactivity and Nuclear Physics," Cork Published by Van Nostrand Co., Inc., 1950, pages 267–8.

Disclaimer 2,905,826.—*Tom W. Bonner*, Houston, and *Richard L. Caldwell*, Dallas, Tex. MEASUREMENT OF GAMMA RAY ENERGY DUE TO INELASTIC NEUTRON SCATTERING. Patent dated Sept. 22, 1959. Disclaimer filed Feb. 26, 1963, by the assignee, *Socony Mobil Oil Company, Inc.*

Hereby enters this disclaimer to claims 1, 5 and 6 of said patent.
[*Official Gazette April 23, 1963.*]